United States Patent
Thornton

[19]

[11] Patent Number: 5,961,853
[45] Date of Patent: Oct. 5, 1999

[54] WELD/BRAZING OF LIGHT METAL ALLOYS

[75] Inventor: Peter Howard Thornton, Dearborn, Mich.

[73] Assignee: Ford Global Technologies, Inc.

[21] Appl. No.: 08/427,332

[22] Filed: Apr. 24, 1995

Related U.S. Application Data

[63] Continuation-in-part of application No. 08/157,555, Nov. 26, 1993, abandoned.

[51] Int. Cl.$^6$ .............................. B23K 11/11; B23K 11/18
[52] U.S. Cl. ........................ 219/85.14; 219/94; 219/91.2
[58] Field of Search ............................. 219/85.14, 85.15, 219/117.1, 118, 94

[56] References Cited

U.S. PATENT DOCUMENTS

| | | |
|---|---|---|
| 434,468 | 8/1890 | Robb . |
| 1,367,522 | 2/1921 | Kicklighter . |
| 3,121,785 | 2/1964 | Terrill et al. . |
| 3,214,564 | 10/1965 | Katzer et al. . |
| 3,592,993 | 7/1971 | Bennett . |

FOREIGN PATENT DOCUMENTS

| | | |
|---|---|---|
| 402958 | 9/1965 | Australia . |
| 58-125383 | 7/1983 | Japan . |
| 60-255285 | 12/1985 | Japan . |
| 63-1483 | 1/1986 | Japan . |
| 61-56785 | 3/1986 | Japan . |
| 63-112065 | 5/1988 | Japan . |
| 63-278679 | 11/1988 | Japan . |
| 5-185245 | 7/1993 | Japan . |

*Primary Examiner*—Teresa Walberg
*Assistant Examiner*—J. Pelham
*Attorney, Agent, or Firm*—Joseph W. Malleck

[57] ABSTRACT

Method of resistance brazing of light metal alloys to form a corrosion resistant structural assembly, comprising: positioning a patch (thickness of about 0.05–0.25 mm and an aspect ratio of about one) of brazing filler metal between and in contact with superimposed light metal (i.e., aluminum, titanium) alloy structural workpieces to define a joining spot, said filler metal consisting of 7–13% silicon, substantial absence of magnesium and copper for aluminum workpieces, and the balance said light metal; while applying high pressure to force the workpieces together at the joining spot to achieve a structural joint, resistively heating the patch to melting without softening the workpieces, except at interfaces with the filler metal, by flowing an electrical current through the patch and aligned portions of the workpieces under ambient conditions and in the absence of flux, the heating and pressure being sufficient to mechanically break up and eliminate any oxides in the workpieces at the joining spot.

11 Claims, 3 Drawing Sheets

WELD/BRAZING OF LIGHT METAL ALLOYS

This is a continuation-in-part application of U.S. Ser. No. 08/157,555 filed Nov. 26, 1993, now abandoned.

BACKGROUND OF THE INVENTION

1. Technical Field

This invention relates to the art of resistance welding or to brazing of metals and more particularly to the integration of welding and spot brazing of light metals, particularly aluminum or aluminum alloys, which are to be used in structural, energy absorbing applications.

2. Discussion of the Prior Art

Resistance spot welding is the primary fastening method in the automobile industry for structural members. The characteristics of such joining method is well documented in welding handbooks and is well suited to joining high resistance metals such as uncoated, low carbon steel. Difficulties arise when applying such spot welding to low resistance metals, such as aluminum. First, resistance heating, needed to effect the weld must be provided by the electrodes, which heating affects electrode tip life as well as weld quality. Secondly, strength of an aluminum spot weld in shear is related to weld nugget diameter. The aluminum spot weld will be composed of a soft cast metal that extends substantially through most of the thickness of the workpiece; increasing the strength of the spot weld will require increasing the diameter of such weld nugget. This is usually not practical because the weld nugget size is set by material and joint geometry, as well as by spot welding schedules. Thus spot welding of aluminum-type workpieces may result in poor strength welds.

Resistance brazing joins work pieces by melting only an interposing filler metal using an electric current passing through the joint itself. Heat is generated primarily by high resistance of the electrodes rather than at the interfaces of the workpieces. Equipment is the same as that used for resistance welding and the pressure needed for establishing electrical contact is ordinarily applied through electrodes; electrode pressure provides a tight joint fit needed for capillary movement of the melted filler metal in the joint. Resistance brazing is desirable because it provides for more accurate control of heat input without heat influencing much of the workpieces, it is much faster in creating the joint, uses less energy than welding and can be easily controlled such as by robots. But spot brazing creates a small or thin fusion zone that is relatively low in strength.

Resistance brazing has been applied commercially to aluminum alloys only on a limited basis. The aerospace industry has utilized resistance brazing only under highly controlled conditions requiring a vacuum environment to insure the absence of oxides. Vacuum brazing is undesirable in the automotive industry because of its high cost, slowness in application, and the need for unusually strict cleanliness. In all other commercial applications, a flux is necessary to ensure dissolution of the oxides inherent on aluminum and to ensure wetting. Flux brazing is undesirable because of the need to remove flux residues to avoid corrosion problems, the presence of porosity in inclusions in the resulting joint, and the likelihood for a weaker joint.

Any attempts to avoid the presence of a flux or the use of a vacuum environment, have required the utilization of copper based filler metals. The presence of copper in the filler metal is undesirable because of electrochemical effects. Copper remains in some form, contiguous with aluminum or titanium, promoting corrosion in an automotive application because of galvanic corrosion. Similarly, the presence of magnesium in the filler metal, when used with aluminum workpieces, must be avoided or severely limited because it prohibits fluidity of the molten filler flowing into narrow gaps to bond or fuse readily.

SUMMARY OF THE INVENTION

It is an object of this invention to provide a more economical method to bond together low resistance, light metal alloy workpieces requiring a lower current density than prior art electric resistance spot welding techniques, but yet producing a cleaner and stronger joint particularly for structural energy absorbing applications in an automotive vehicle without need for flux or surface preparation.

It is also an object to provide essentially a one-stage method of resistance brazing of aluminum members which is a combination of welding and brazing techniques, but differs from each in that the resistance heating is provided by the interfaces between the metal members and filler metal, not by the electrodes or metal members.

The invention in a first aspect is a weld-braze method of joining light metal alloy workpieces having low resistivity to form a corrosion resistant structural assembly, comprising: (a) positioning a patch of brazing filler metal between and in contact with said light metal alloy workpieces superimposed to define a brazing spot, the filler metal consisting essentially of 7–13% by weight silicon, substantial absence of copper and magnesium, and the balance essentially a light metal alloy of the workpieces; and (b) while applying high pressure to force the work pieces together at the joining spot to achieve a structural joint relationship, resistively heating the interfaces between patch and workpieces to a melted condition without softening the workpieces except at the interfacing surfaces thereof, said heating being carried out by flowing an electrical current through the patch and the aligned portions of the work pieces under ambient conditions and in the absence of a flux, the heating and pressure being sufficient to mechanically break up and eliminate any oxides or lubricant on the interfacing surfaces of the workpieces at the joining spot. It is not necessary to clean or remove any surface lubricant which may have been applied for metal stamping purposes.

Another aspect of this invention is a product resulting from the practice of the method described above, the product being particularly characterized by a brazed spot that has an absence of porosity and inclusions, the light metal workpieces being molecularly fused together without any separation or interruption, and a shear strength in the range of 3 to 10 kN.

DETAILED DESCRIPTION AND BEST MODE

Figure 1:
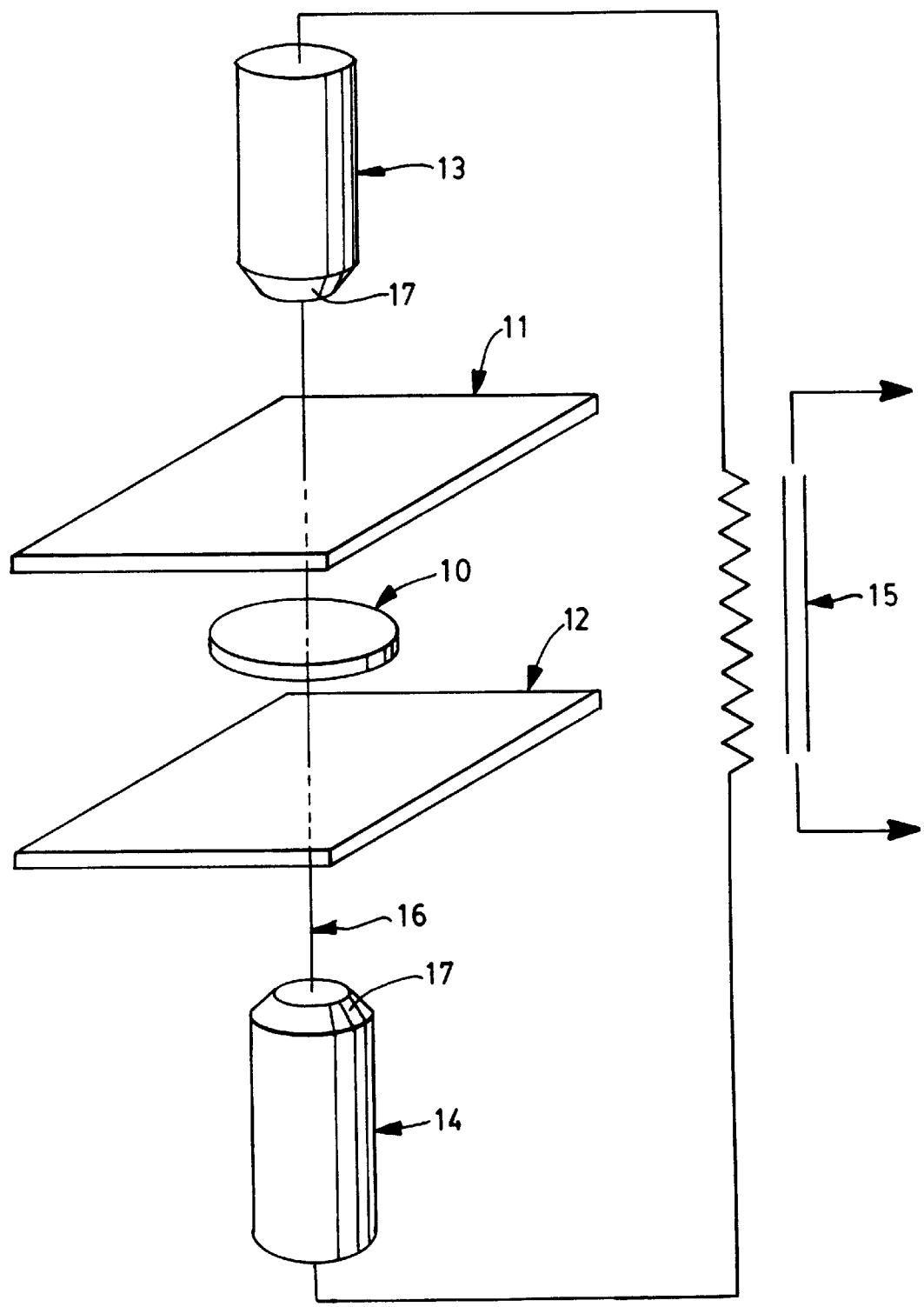
FIG. 1 is an exploded view of the manner of making the joint showing separated workpieces, interposed filler metal and opposed electrodes aligned with the filler metal.

Parts of many different shapes can be spot resistance welded/brazed, provided that the surfaces to be joined are either flat or conform over a sufficient contact area and provided they can be held together under pressure to permit the heating current to flow through the joint and allow the melted filler metal to be distributed throughout the joint interface by capillary action. Workpieces can be joined by resistance welding/brazing with spot diameters that range from 3 mm to >10 mm, depending upon the thickness of the sheet materials being joined. The joint diameters in most high production resistance spot welding is usually of this order in size.

The method of this invention requires essentially two steps, the first of which is to position a patch 10 of brazing filler metal between and in contact with superimposed light metal structural workpieces 11, 12 without the presence of flux. The patch of filler metal is made up of an alloy of the workpiece metal having an alloying ingredient that lowers its melting temperature about 10–20%. When the workpieces are constituted of an aluminum based material, the filler metal is an aluminum alloy consisting essentially of 7–13% silicon, and the balance essentially aluminum; the alloy is substantially devoid of copper and magnesium. The filler metal is preferably a thin piece of sheet material, 0.05–0.25 mm thick and preferably has its alloy content adjusted to achieve a melting temperature in the range of 1090°–1120° F. for aluminum workpieces. The size of the filler piece should be somewhat larger than the expected diameter of the finished spot brazed diameter.

The workpieces 11, 12 are formed of light metals (a light metal is defined herein to mean metal having low electrical resistivity, and includes aluminum, titanium and alloys thereof). The metal of the filler must be modified to be suitable for brazing the workpieces if the workpieces are other than an aluminum alloy. In the case of titanium workpieces, the filler metal is alloyed with aluminum to obtain a suitable lower melting temperature. The filler metal may contain 8–20% other metals excluding copper and magnesium and the balance the light metal of the workpiece, provided such other metals do not detract from a strong corrosion-resistant joint.

It is desirable to further control the thickness of the brazing metal insert to be in a range of 0.09–0.23 mm to enable the resistance spot brazing to function even more optimally. Due to the absence of a flux, the joint design has greater freedom and may include any of the conventional joint designs such as tee, lap, flange, lock, seam, butt and even scarf joints.

The electrodes 13, 14 for carrying out of resistive heating typically should have a circular diameter in the range of 12–25 mm with a spherical contact surface 17 having a radius of 50–100 mm, thereby to promote conentrated spot heating and current flow. The electrodes have an internal resistance of about 80–90% of an IACS (international conductivity standard) electrode constituted of silver. A carbon electrode would be about 10% of such standard, and are supplied with current in the range of 20–35 kA from a power supply 15. The electrodes should be formed of high conductivity copper strengthened with additions of chromium and other strengthening agents, and should have internal cooling, such as by water. Such electrode is deemed a low resistance electrode, different than brazing electrodes which have a high resistance resulting from tungsten or molybdenum facings or because they are constituted of carbon/graphite or Pt—Rh. The electrodes do not provide the heat source for the joining of the invention. Thus, traditional brazing is not employed by this invention because both low resistive electrodes as well as workpieces are employed.

Thus, the second step of the process is to apply resistive heating while at the same time applying high force (about 500–1000 pounds) from the electrodes to the workpiece to bring them together at the desired brazing spot or a locus axis 16 and with a force sufficient to achieve a structural joint; the heating is carried out to heat the patch only to melting while softening only the interfacing surface of the workpieces. This is made possible by the limited contact at the facing surfaces and the limited electrical resistance of the materials between the electrodes. Electric current is passed through the patch and through the aligned portions of the workpieces under ambient conditions and in the absence of any flux. Invariably the prior art must rely on an inert atmosphere, usually accompanied by some degree of vacuum.

The heating and pressure must be correlated so as to mechanically break up and eliminate any oxide on the interfacing surfaces of the work pieces at the spot. To do this, the heating must be controlled to be in the temperature range sufficient to melt the filler (i.e., 20–35 K amps); such current range has been proven to be lower than the range required for resistance spot welding or other types of resistive brazing (i.e., 30–40 K amps). The application time of the current may be 12 cycles of 60 Hertz so that it can be applied for a very short period of about 200 milliseconds. The mechanical force that is applied to the electrodes and thence to the workpieces and intervening filler metal, should be at a level of about 5000N to achieve an adequately bonded area in a 2 mm thick sheet.

Figure 2:
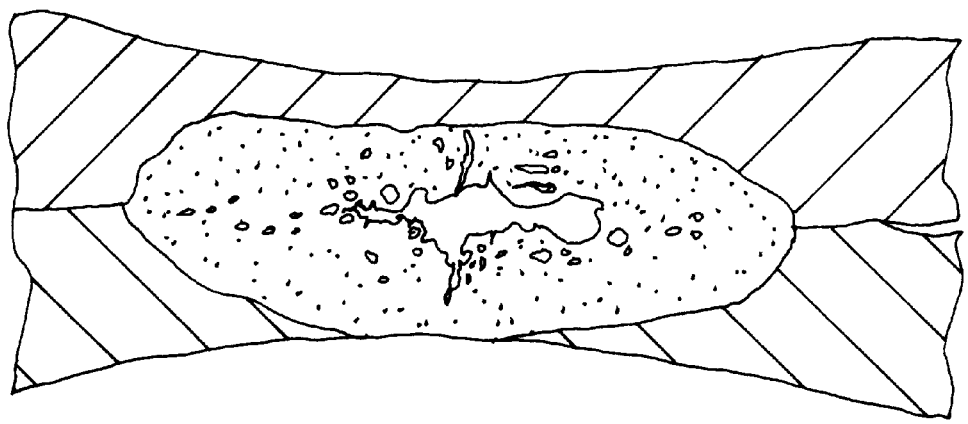
FIG. 2 is a magnified depiction (12×) of an etched section of a spot welded joint made in accordance with the prior art.
Figure 3:
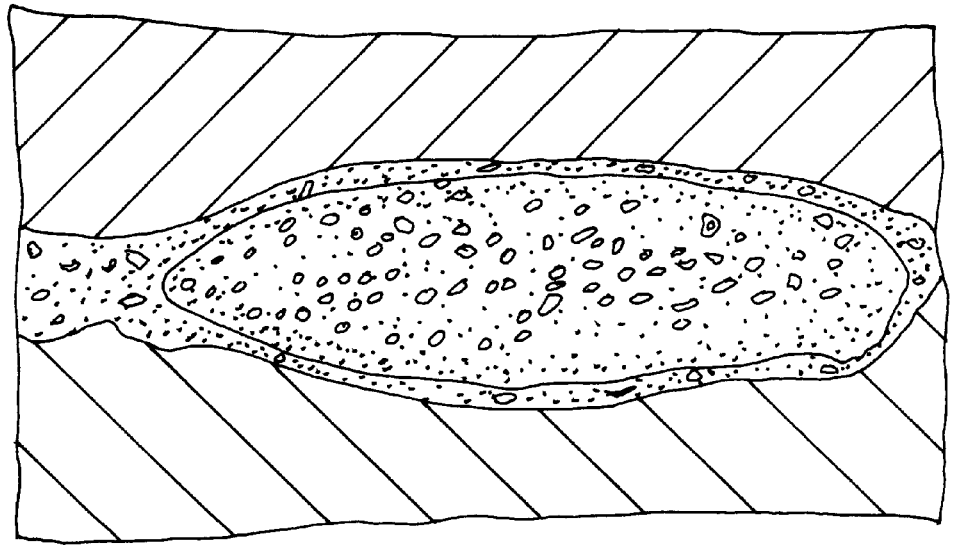
FIG. 3 is a depiction (12×) like FIG. 1, but showing an etched section of a spot brazed joint of the same materials and in conformity with the principles of this invention.
Figure 4:
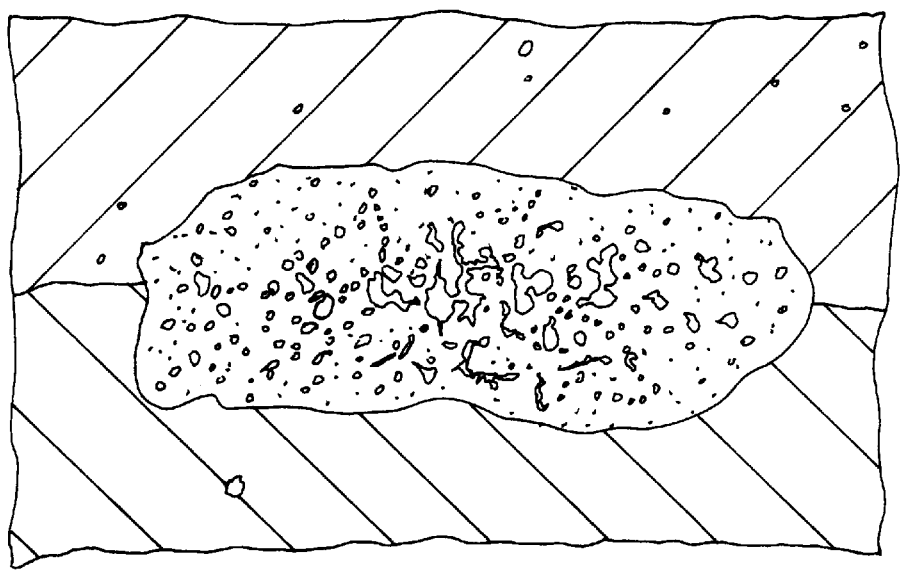
FIGS. 4 and 5 are unetched sections for respectively the same joints as in FIGS. 2 and 3.
Figure 5:
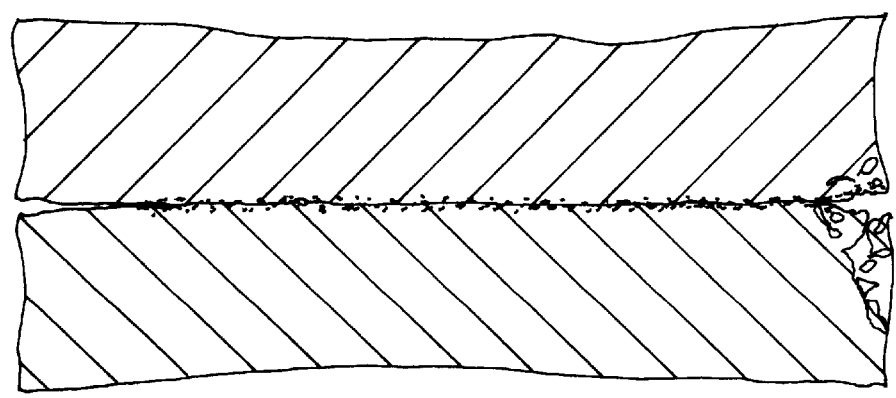

The product produced by the method of this invention is particularly characterized by a joint that has an absence of inclusions or porosity. For example, comparing FIGS. 2 and 3, it can be seen that in FIG. 2 the prior art resistance brazing method traps a considerable amount of hydrogen, oil and other oxides which are dissolved in the aluminum and thereby create considerable porosity. Even in the unetched section condition of FIG. 4, porosity is quite evident. Heat generated at the interface surfaces between the filler metal and workpieces, melts the filler metal and softens a thin surface layer of the workpieces to permit molecular fusion to effect a weld nugget. In the joint of this invention (FIGS. 3 and 5), the molecular fusion of the aluminum workpieces together at the interfaces with the brazing metal occurs without the presence of any noticeable porosity and with reduced deformation of the surface between the two workpieces. The strength of such a joint is dependant upon the size of the brazed spot and, as a result of the practice of this invention, is enhanced to be 25% greater than that which would normally be achieved with other types of resistance spot welding.

I claim:

1. A fluxless method of weld/brazing of light metal alloys to form a corrosion resistant structural assembly, comprising:
   (a) positioning a patch of brazing filler metal between and in contact with superimposed light metal alloy structural workpieces to define a joining spot, said filler metal consisting of a light metal alloy essentially consisting of 7–13% silicon, substantial absence of copper and magnesium, and the balance essentially a light metal alloy of the workpieces;
   (b) while applying high pressure to force the workpieces together at said joining spot to achieve a structural joint, resistively heating the interface between said patch and workpieces to melting without softening the workpieces, except at the interfacing surfaces thereof, by flowing an electrical current through the patch and aligned portions of the workpieces under ambient conditions and in the absence of flux, said heating and pressure being sufficient to mechanically break up and eliminate any oxides or lubricant on the interfacing surfaces of the workpieces at said joining spot and fuse said workpieces together.

2. The method as in claim 1, in which low resistance electrodes are used to apply said high pressure and to facilitate resistive heating.

3. The method as in claim 1, in which said patch has an aspect ratio of about one and a thickness in the range of 0.05–0.25 mm.

4. The method as in claim 1, in which said light metal in said work pieces is selected from the group consisting of aluminum, titanium and alloys thereof, said light metal workpieces having a thickness in the range of 0.5–10 mm.

5. The method as in claim 1, in which the filler metal is a solid piece and has a chemistry selected to melt within the temperature range of 1090°–1120° F.

6. The method as in claim 1, in which during step (b), said pressure applied is in the range of 4,000–6,000N (500–1000 pounds).

7. The method as in claim 1, in which the current used in step (b) is in the range of 20–35K amps, said current being applied for a period of time of about 200 milliseconds.

8. The method as in claim 1, in which said step (b) is carried out to produce a brazed spot having a diameter between 3–10 mm.

9. The method as in claim 1, in which a pair of water cooled high conductivity copper alloy electrodes are utilized to apply the heating as well as the pressure to the spot, said electrodes having a low electrical resistance.

10. The method as in claim 1, in which said work pieces are positioned together with the patch therebetween to form a joint, said joint design being selected from the group of lap, flange, lock, seam, tee, butt and scarf, and said workpieces providing a resistance at the interface with the filler metal of about $20\mu$ ohms.

11. A product produced by the practice of claim 1, in which the resulting brazed spot (i) has an absence of porosity and inclusions, (ii) the light metal members are molecularly fused together without separation or interruption, and (iii) the brazed joint has a shear strength in the range of 4–8 kN.

* * * * *